United States Patent
Hawley

(10) Patent No.: US 9,665,645 B2
(45) Date of Patent: May 30, 2017

(54) SYSTEM FOR MANAGING AN AVIONIC COMMUNICATIONS LOG

(71) Applicant: Garmin International, Inc., Olathe, KS (US)

(72) Inventor: Terrance R. Hawley, Silverton, OR (US)

(73) Assignee: Garmin International, Inc., Olathe, KS (US)

( * ) Notice: Subject to any disclaimer, the term of this patent is extended or adjusted under 35 U.S.C. 154(b) by 139 days.

(21) Appl. No.: 14/593,037

(22) Filed: Jan. 9, 2015

(65) Prior Publication Data

US 2016/0202950 A1 Jul. 14, 2016

(51) Int. Cl.
G06F 17/00 (2006.01)
G06F 17/30 (2006.01)
G08G 5/00 (2006.01)

(52) U.S. Cl.
CPC ..... *G06F 17/30743* (2013.01); *G08G 5/0013* (2013.01); *G08G 5/0021* (2013.01); *G08G 5/0052* (2013.01)

(58) Field of Classification Search
CPC .......................... G08G 5/0021; H04B 7/18506
See application file for complete search history.

(56) References Cited

U.S. PATENT DOCUMENTS

| 7,606,715 | B1 * | 10/2009 | Krenz | 704/275 |
| 2010/0027768 | A1 * | 2/2010 | Foskett | H04B 7/18506 379/88.14 |
| 2011/0268295 | A1 * | 11/2011 | Yamkovoy | H04B 1/385 381/119 |
| 2012/0054641 | A1 * | 3/2012 | Sae-Chim | G06F 3/0489 715/752 |
| 2013/0346081 | A1 * | 12/2013 | Loubiere | G08G 5/0013 704/260 |

OTHER PUBLICATIONS

Printout from http://www.cnet.com/news/how-to-increase-the-font-size-in-ios/, published prior to Jan. 9, 2015.

(Continued)

*Primary Examiner* — Thomas Maung
(74) *Attorney, Agent, or Firm* — Samuel M. Korte; Max M. Ali

(57) ABSTRACT

A system for managing a communications log of audio data transmissions received and/or transmitted by an ownship aircraft includes a display screen, a memory operable to store audio signals and data associated with audio data transmissions, and a processor coupled to the display screen and to the memory. The processor determines the transmission frequency and time of receiving each received audio data transmission and creates a plurality of discrete display messages that include text identifying the determined frequency and time of receiving each received audio data transmission. The processor causes the discrete display messages to be displayed on the display, where they are selectable for playback by a user. Once selected, the processor generates an audio reproduction of the stored audio signals associated with the selected discrete display messages.

22 Claims, 5 Drawing Sheets

(56) References Cited

OTHER PUBLICATIONS

Printout from http://support.uiwtx.edu/Computer/PDF/avaya.pdf , published prior to Jan. 9, 2015.
Printout from http://www.I-3ar.com/PDF_Files/MKT047_FA2100CVDR.pdf , published prior to Jan. 9, 2015.
Claudiu Geacar, Reducing Pilot/ATC Communication Errors Using Voice Recognition, 27$^{th}$ International Congress of the Aeronautical Sciences, 2010.

* cited by examiner

SYSTEM FOR MANAGING AN AVIONIC COMMUNICATIONS LOG

BACKGROUND

Modern aircraft operate in a relatively congested environment that requires near constant communications with outside agencies, such as air traffic control and other aircraft, as well as internal communications with members of the flight crew, to ensure the safe operation of the aircraft. The pilot(s) of an aircraft typically must take a series of important actions relating to significant events in high traffic areas, such preparing for landing and aborting a landing if commanded to do so by air traffic controllers. In areas of high traffic concentrations, such as a terminal area of an airport, there may be 10, 20, or 50 or more aircraft sending or receiving communications on the same radio frequency. Given the critical nature of radio communications in such areas, pilots of aircraft operating in these areas must pay close and constant attention to every transmission to identify communications intended for them and heighten situational awareness. Pilots obtain situational awareness by understanding what is occurring around them using all of the information that is available to them. For example, pilots can look out the window or examine aircraft traffic systems to understand the movements of nearby aircraft. Similarly, pilots can use audio data transmissions sent from other aircraft to anticipate the actions and needs of the other aircraft as well as adapting to a rapidly changing environment in order to continue operating the ownship aircraft in a safe manner.

Even with diligent monitoring of the radio transmissions, often the pilot(s) of an aircraft will not correctly interpret parts of a communication or may miss a communication altogether. Adding to the problem are weak or garbled transmissions and multiple transmissions occurring simultaneously (commonly referred to as communications "stepping on" one another). Because certain transmissions may be missed or misinterpreted, pilots often need to request audio data transmissions be repeated, which further congests already nearly saturated radio frequencies. A dangerous event may occur if even one audio data transmission is missed or misinterpreted, without proper clarification, by a pilot.

For example, if an air traffic controller instructs an aircraft to climb to 10,000 feet and the pilots misinterpret this instruction and climb to 11,000 feet, the aircraft may be put in close proximity to another aircraft already operating at or that will be operating at 11,000 feet in the same area. Thus, the potential for a mid-air collision may heighten if audio data communications are not received, understood and applied in a timely manner. Similarly, if an air traffic controller issues instructions for an aircraft to land on runway 27 right and the pilots misinterpret the instructions as clearance to land on runway 27 left, another potentially hazardous situation may occur if the pilots apply the misinterpreted instructions as another aircraft may be operating on runway 27 left. Similar situations may be created in nearly all phases of flight or ground operations between aircraft or between aircraft and sources providing information to local aircraft, such as air traffic control and broadcasts with aviation information (e.g., weather, emergencies, etc.).

Currently, the only solution to a missed or misinterpreted radio transmission is for the transmitting or receiving agency to repeat the transmission until the receipt of the transmission is confirmed and properly understood. Occasionally, such transmissions may need to be repeated multiple times, which congests valuable transmission bandwidth.

SUMMARY

Systems and techniques are described for managing communications logs of audio data transmissions. More specifically, the system may display discrete display messages including textual information relating to incoming and outgoing audio data transmissions. The audio data transmissions may include incoming and outgoing communications having audio signals (audio clips), informational data content, or any combination thereof. The audio data transmissions are received by a first communications radio tuned to a first frequency and a first audio communications data input is operable to receive audio signals associated with the audio data transmissions received from an external source. The first communications radio may be a communications radio (COM1 or COM2) or a navigation radio (NAV1 or NAV2).

Generally, the invention includes electronic equipment that saves, accesses, and displays information relating to audio data transmissions that are received or transmitted by communications systems. The electronic equipment creates an electronic communications log of audio data transmissions that allows a user to playback a discrete audio data transmission at a later time by selecting a discrete display message associated with the discrete audio data transmission. The electronic equipment determines the transmission frequency and the time of receiving each received audio data transmission, creates a plurality of discrete display messages associated with each received audio data transmission including text identifying the determined frequency and the determined time of receiving each received audio data transmission, and displays the discrete display messages on a display screen for selection by a user. Once a discrete display message is selected, the electronic equipment generates an audio reproduction of the selected discrete audio data transmission for playback.

In one or more embodiments, a system for managing a communications log of audio data transmissions received by an ownship aircraft includes a display screen, a memory operable to store audio signals and data associated with audio data transmissions, a first audio communications data input configured to be communicatively coupled to a first communications radio tuned to a first frequency and operable to receive audio signals associated with audio data transmissions received from an external source, and a processor coupled to the display screen, to the memory, and to the first audio communications data input. The processor operates to determine the transmission frequency and the time of receiving each received audio data transmission, create a plurality of discrete display messages associated with each received audio data transmission including text identifying the determined frequency and time of receiving each received audio data transmission, and cause the display screen to display the discrete display messages. The discrete display messages are displayed on the display screen and are selectable by a user. The processor further operates to generate an audio reproduction of the stored audio signals associated with the selected discrete display messages for playback when the discrete display messages are selected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

Figure 1:
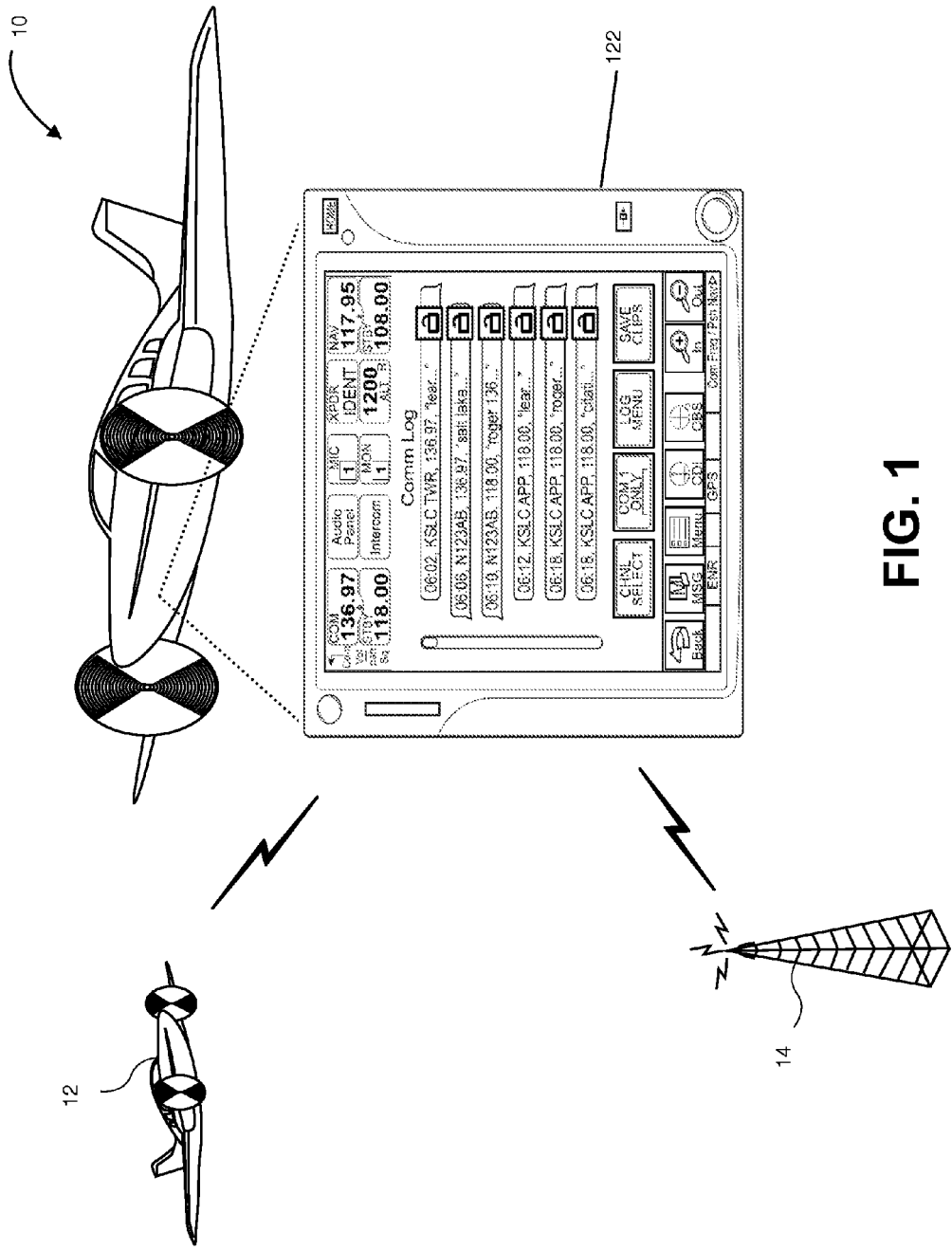
FIG. 1 is a schematic representation of an aircraft operating in a radio communications environment.

The following detailed description of various embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Avionics systems typically include an audio panel, one or more communications radios and speakers or headsets worn by aircraft pilot and/or crew to receive incoming audio data transmissions and transmit outgoing audio data transmissions. The audio panel can include audio inputs, including a plurality of ports, jacks, interfaces, wiring connectors, and/or other inputs for coupling with and receiving audio communications from a plurality of audio sources. The audio panel can include audio outputs, including a plurality of ports, jacks, interfaces, wiring connectors, and/or other outputs for coupling with and outputting audio communications to audio equipment in the aircraft. The speaker or headset can include audio inputs, including an audio output from an audio panel, to audibly output an audio signal to an aircraft pilot and/or crew. The headset may include a microphone (MIC) operable to receive audible audio signals from an aircraft pilot and/or crew and output the audio signals to aircraft equipment. The audio data transmissions include audio signals that may be output by the speaker or headset or input using the headset microphone.

The audio inputs may include an audio input for receiving audio communications from a first communication (COM1) radio transceiver, an audio input for receiving audio communications from a first microphone (MIC1) associated with the pilot, an audio input for receiving audio communications from a second communication (COM2) radio transceiver, an audio input for receiving audio communications from a second microphone (MIC2) associated with the co-pilot, an audio input for receiving information from a first navigation (NAV1) receiver, and an audio input for receiving information from a second navigation (NAV2) receiver. Audible communications and informational data content communicated on COM1, COM2, NAV1, and/or NAV2 may provide useful information for the aircraft pilot and crew. The audio inputs may also include an audio input for receiving audio communications from a first auxiliary (AUX1) radio transceiver, an audio input for receiving audio communications from a second auxiliary (AUX2) radio transceiver, and an audio input for receiving information from a telephone (TEL). The audio inputs may further include an audio input for receiving audio communications from a first entertainment radio, media player (e.g., MP3 player), or other similar media source (MUS1). The audio inputs may also include an audio input for receiving audio communications from a second entertainment radio, MP3 player, or other similar media source (MUS2).

The audio outputs of an audio panel may include a port, jack, interface, or wiring connector communicating audio signals on a left audio channel and right audio channel. The audio outputs may couple with the speaker or headset of an aircraft pilot or crew. In some embodiments, the audio outputs of a headset may include a left speaker to audibly output audio signals communicated on a left communication channel and right speaker to audibly output audio signals communicated on a right communication channel. For example, the audio signals output by the headset may include audio signals communicated from the audio output of an audio panel (e.g., left audio jack) on a left communication channel and audio signals communicated from the audio output of an audio panel (e.g., right audio jack) on a right communication channel.

Conventional avionics systems may employ primary flight display(s) (PFDs) and multifunction display(s) (MFDs) to provide primary flight control, navigational, and other information to the flight crew (e.g., the pilot and/or the co-pilot) of an aircraft. These conventional systems may integrate a display device and an input/output interface to control various functionalities of each system. In many instances, a member of the flight crew may wish to interface with one or more aspects of the information conveyed through the display devices to manipulate the information. For example, a pilot may wish to manipulate (e.g., pan, enlarge, or reduce) a map display, or select waypoints on the map display. In large commercial aircraft, the flight crew may interface with displayed information via manipulation of a cursor displayed over (e.g., presented within) the information using a dedicated cursor control device such as a dedicated touch pad, trackball, joystick, or the like. However, the displays in these systems do not categorize each of the discrete audio data transmissions or create a plurality of discrete display messages associated with each received audio data transmission to aid the flight crew with identifying relevant audio data transmissions for playback or the content of the audio data transmissions.

FIG. 1 is a schematic representation of an aircraft 10 operating in a radio communications environment. The radio communications environment may be controlled or uncontrolled in the sense that a controlled environment is one that requires constant contact with an air traffic control agency and an uncontrolled environment does not require constant contact with an air traffic control agency. Regardless, incoming and outgoing communications using audio data transmissions are necessary in both controlled and uncontrolled environments. For example, the aircraft 10 may transmit and receive radio communications with a ground based air traffic control facility 14, such as an airport tower, an approach control facility, an enroute center control facility, or a ground control facility. Additionally, the aircraft 10 may transmit and receive radio communications with other aircraft 12 over common radio frequencies, such as a Common Traffic Advisory Frequency (CTAF), Unicom frequency, or a Guard frequency (e.g., 121.5 MHz). It is to be understood that the flight crew of aircraft 10 may use and/or monitor a plurality of frequencies for communications, navigation, or other purposes. The audio data transmissions received or transmitted over a plurality of frequencies may be captured and logged by a system for managing a communications log (which is described further below) and selected for playback using discrete display messages associated with each received audio data transmission displayed on a display device 122 for the pilot(s) convenience.

Figure 2:
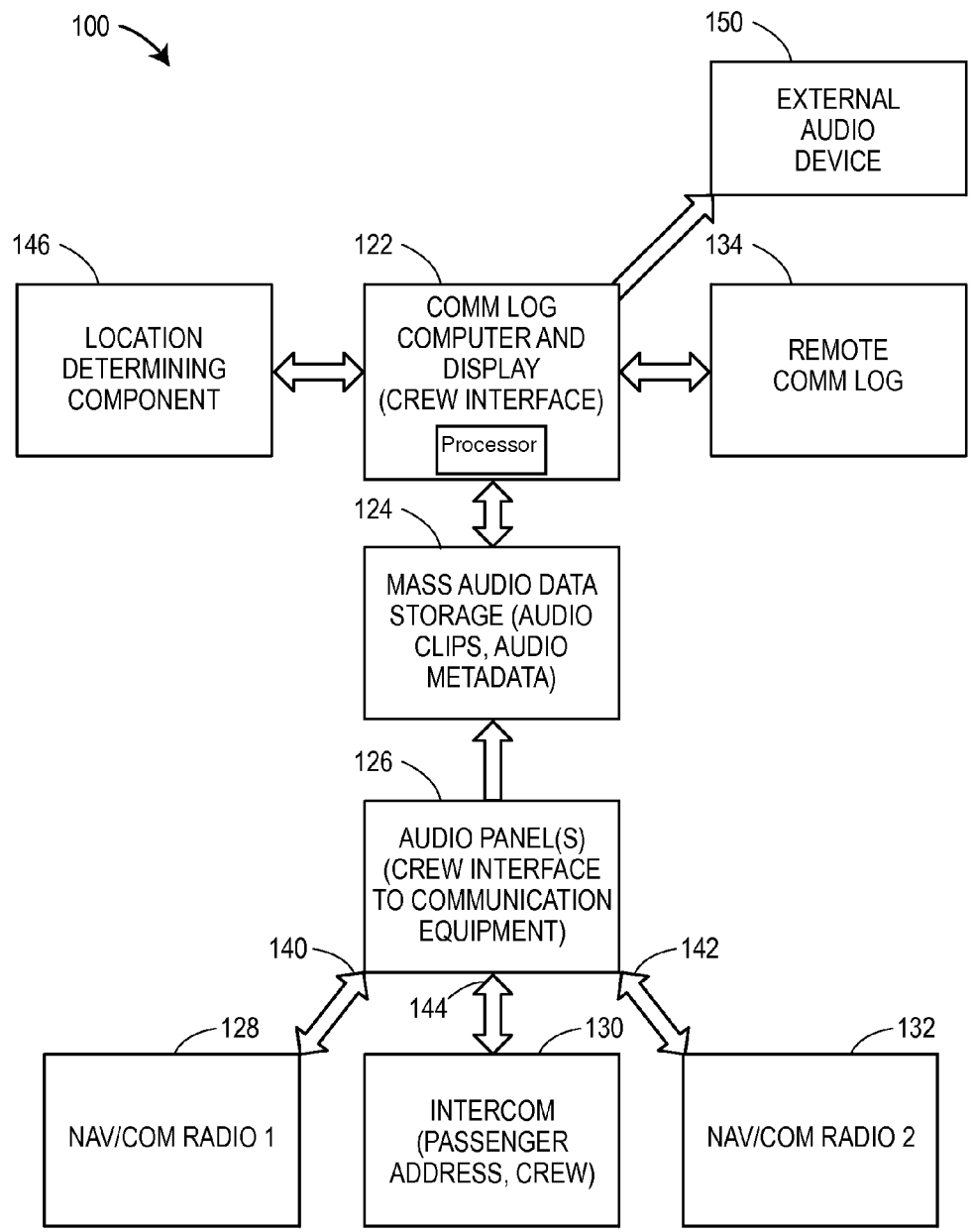
FIG. 2 is a schematic representation of a system for managing a communications log constructed in accordance with the teachings of the disclosure.

Turning now to FIG. 2, a system for managing a communications log 100 of audio data transmissions includes a computer and display 122 that is coupled to a memory 124, such as a mass audio data storage device. The memory 124 is operable to store audio signals and data associated with audio data transmissions. An audio panel 126, such as a communications radio panel or radio head, is coupled to the memory 124. Audio data transmissions, including audible audio signals associated with the verbal content of the transmitted and/or received radio communications, may be passed from the audio panel 126 to the memory 124 and/or to the computer 122 for processing. The computer 122 may use one or more routines stored in the memory 124 and executable on the processor to implement all of the methods and techniques described herein. For instance, the computer 122 may process the audio signals to determine the audible content and the discrete display messages further include text identifying the audible content. In one embodiment, the audio panel 126 may be coupled to the memory 124, as illustrated in FIG. 2. In other embodiments, the audio panel 126 may be coupled directly to the computer 122, or directly to both the computer 122 and the memory 124.

The system 100 may include a location determining component 146 that is coupled to the computer 122, the memory 124, and the audio panel 126. In embodiments, the computer 122 may determine the source of each received audio data transmission based on the position of the ownship aircraft 10 as determined by the location determining component 146. The location determining component 146 may comprise a receiver that is configured to receive signals from one or more position-transmitting sources. For example, the location determining component 146 may be configured for use with a Global Navigation Satellite System (GNSS). In embodiments, the location determining component 146 may be a Global Positioning System (GPS) receiver operable to receive navigational signals from GPS satellites and to calculate a location of the ownship aircraft 10 (FIG. 1) as a function of the signals. Other exemplary position determining systems include, but are not limited to: a Global Orbiting Navigation Satellite System (GLONASS), a Galileo navigation system, and/or other satellite or terrestrial navigation systems. In embodiments, the location determining component 146 may be integral with the computer 122. Moreover, in other embodiments, the location determining component 146 may be configured as one or more separate components that communicate position information with the computer 122 and an ADS-B system (e.g., with the ADS-B receiver) via a wired or wireless interface. A variety of configurations are possible.

A first communications radio 128 may be coupled to the audio panel 126 at a first audio communications data input/output 140. In the embodiment of FIG. 2, the first communications radio 128 may be an aircraft communications radio, such as a VHF radio, a UHF radio, or a HF radio. The first communications radio 128 may alternatively be a navigation radio, for example a ground based radio receiver, such as a VOR receiver, a TACAN receiver, a VORTAC receiver, or a localizer receiver, a satellite navigation radio receiver, such as a GPS receiver, or a radio capable of receiving telephone calls. In other embodiments, the aircraft communications radio may be any other type of communications radio, such as the Iridium satellite communication system or ground based cellular system. Similarly, a second communications radio 132 may be coupled to the audio panel 126 at a second audio communications data input/output 142. The second communications radio 132 may be virtually any type of radio, such as the types of radios given above for the first communications radio 128. The first and second audio communications data inputs/outputs 140, 142 may be used to receive communications from one or more external sources and informational data content associated with each audio data transmission, such as communications between the pilots and ground based air traffic control 14, communications between the pilots of the ownship aircraft 10 and pilots of other aircraft 12, or communications received by the navigation equipment of the system 100 providing navigational information to the pilots of the ownship aircraft 10 and pilots of other aircraft 12.

In some embodiments, an internal communications system 130, such as an intercom, may be coupled to the audio panel 126 at a third audio communications data input 144. The third audio communications data input 144 may be used to capture internal communications, such as communications between pilots, cabin crew and passengers of aircraft 10.

Audio signals and data associated with audio data transmissions received by or transmitted from the first, second, and/or third communications radios 128, 132, 130, may be sent or communicated to the computer 122 by the audio panel 126 through the memory 124. Each of the first, second, and/or third communications radios 128, 132, 130 may be tuned to unique frequencies. In other embodiments, the audio signals and data associated with audio data transmissions may be sent directly to the computer 122 for processing. The computer 122, which includes a computer processor that is coupled to the display screen, may receive discrete audio data transmissions from the communications radios 128, 132, 130, categorize each of the discrete audio data transmissions, and store the discrete audio data transmissions in memory 124. The processor of computer 122 may determine the transmission frequency and the time of receiving each audio data transmission was received by the communications radio and the audio communications data input/output. The transmission frequency and time of receiving the audio data transmission may be determined by processing the audio data transmissions or using system information accessible to the processor. For instance, the processor of computer 122 may be communicatively coupled with other elements of the system 100 such that the processor may determine that first communications radio 128 is tuned to a first radio frequency, the second communications radio 132 is tuned to a second radio frequency and the third communications radio 130 is tuned to a third radio frequency. Similarly, the processor of computer 122 may determine the transmission frequency and the time each audio data transmission was received by second and third communications radios 132, 130 and the second and third audio communications data input/outputs 142, 144.

The processor of computer 122 may process the audio signals and data associated with the audio data transmissions and available system information to determine a variety of other information for each audio data transmissions. For instance, the processor may determine the source of the audio data transmission, location of the ownship aircraft 10 when the audio data transmission was received, audible content of the audio data transmission, type of audio data transmission, a color code based on the type of audio data transmission, a communications radio type, a station identifier, duration of the audio data transmission, age of the audio data transmission (e.g., by seconds, minutes, hours, days, etc.), date of the audio data transmission, audio quality and audio fidelity, and a leader indication used by the processor to determine whether the discrete audio data transmission originates from an ownship aircraft or from an external source. In embodiments, the processor of computer 122 may receive an input from the pilot to associate a tag lock command with one or more discrete display messages and cause the display device to pin the tag locked discrete display message to the display screen such that the tag locked discrete display message(s) are continued to be displayed as other discrete display messages presented on a display area of the display device 122 are automatically removed from the display area. For instance, the discrete display messages that are not associated with a tag local command may be presented on the display device 122 until they are replaced by newer discrete display messages that are not associated with a tag local command. The discrete display messages that are not associated with a tag local command may be presented in a scrolling manner under the tag locked discrete display messages pinned to (i.e., continued to the displayed by) the display device 122.

The processor may determine the source of an audio data transmission based on the determined position of the ownship aircraft when the audio data transmission was received or transmitted. In some embodiments, the determined frequency and/or informational data content, such as a unique source identifier, within the audio data transmission.

The processor may determine the location of the ownship aircraft when the audio data transmission was transmitted and/or received based on the position of the ownship aircraft 10 determined by the location determining component 146. In embodiments, the processor of computer 122 may associate the determined location of the ownship aircraft 10 when the audio data transmission was transmitted and/or received with the audio data transmission.

The processor of computer 122 may determine the audible content (subject matter) of the audio signals in a textual form by applying speech-to-text techniques. For instance, the processor of computer 122 may process the audio signals to determine the audible speech within the audio data transmission. In embodiments, the processor may identify one or more terms within the determined audible content as important communications within the audio data transmission. For instance, the processor may determine the full audible content of an audio data transmission to be "salt lake tower Lear 123AB with you at 9000" and identify the terms "salt lake" and "9000" to be important communications. If the terms are reviewed at a later time, the pilot(s) could quickly recognize that an audio data transmission was sent to the Salt Lake City Control Tower and that the altitude was 9000 feet. Similarly, the processor may identify the terms "Lear 123AB" as the important communication. If these two terms were reviewed at a later time, the pilot(s) could quickly recognize that the ownship aircraft was identified as a Learjet™ aircraft and the N-Number (FAA aircraft registration number) of the aircraft was identified as "123AB." In embodiments, the processor may cause the display screen to display the identified terms or the full textual representation of the audio data transmission with additional information in a discrete display message for this audio data transmission.

The processor of computer 122 may determine the type of audio data transmission and associate a color code for discrete display messages of each determined type of audio data transmission. For instance, audio data transmission communication types may include emergency notifications, flight instructions from air traffic control, communications with other aircraft 12, communications within the ownship aircraft 10, weather information. The processor of computer 122 may also communicate with other elements of system 100 to determine the type of communications radio that transmitted or received the audio data communication of interest. For instance, the processor may determine the first, second, and/or third communications radios 128, 132, 130 are configured to operate as a communications radio, navigation radio and intercom, respectively. The communication radio type may also be identified based on the frequency band, such as VHF1, VHF2, HF1, HF2, UHF1, UHF2.

The processor of computer 122 may determine and identify a station identifier associated with a ground station controller 14 that communicated with the ownship aircraft 10 by processing the audio data transmission to identify tones (e.g., morse code) that provide the station identifier. In embodiments, the processor may determine the station identifier based on a determined location of the ownship aircraft 10 by the location determining component 146 when an audio data transmission was received and the determined transmission frequency of the audio data transmission. In embodiments, memory 146 may store a table listing the geographic locations of ground-based transmitters (e.g., air traffic control), the frequencies used by each transmitter, and any unique identifiers associated with each transmitter. The processor may utilize the stored location, frequency and station identifier information to determine the station identifier for an audio data transmission.

The processor of computer 122 may process the audio data transmission, including associated audio signals, to determine the duration of each audio data transmission, the amount of time that has passed (e.g., second, minutes, hours, days, etc.) since the audio data transmission was received or transmitted by a communications radio, and the calendar date of the audio data transmission. In embodiments, the processor of computer 122 controls the display device to display the discrete display messages associated with each audio data transmission in chronological order such that the most recent audio data transmissions are presented at the top of the display device.

The processor of computer 122 may also evaluate the audio quality and audio fidelity of the audio signals associated with the audio data transmissions to determine whether the communication may be incomplete or degraded due to signal interference or other partial transmissions.

The processor of computer 122 may determine whether an audio data transmission originated from within the ownership aircraft 10 or an external source, such as other aircraft 12 or ground based air traffic control facilities 14. The processor may use a leader indication to determine whether the discrete audio data transmission originates from an ownship aircraft 10 or from an external source, such as other aircraft 12 or ground based air traffic control facility 14, by causing the display device to display discrete display messages identified as a leader from one side of the display device (e.g., incoming communications are offset from the right and outgoing communications are offset from the left).

The processor of computer 122 may create a plurality of discrete display messages associated with each received audio data transmission to aid the flight crew with identifying relevant audio data transmissions for playback or the content of the audio data transmissions. The discrete display messages may include textual information to help the pilot(s) identify the relevant audio data transmission. For instance, the discrete display messages including text identifying the determined frequency and time of receiving each received audio data transmission. In other embodiments, the discrete display messages may provide information using non-textual forms, such as graphics and icons.

The processor of computer 122 causes the coupled display device to display a plurality of discrete display messages, thereby creating a visual communications log of audio data communications for the pilots' use. Each discrete display message conveys certain textual information, such the frequency and time of the audio data transmission. Each discrete display message displayed by the coupled display device is selectable by the pilots. The discrete display messages may be selected by a touch input received by a touch screen associated with the display device, a user input received by one or more buttons and/or knobs included within system 10. For instance, a user may use one or more buttons and/or knobs to scroll through the communications log of audio data communications, identify a discrete display message of interest and select the discrete display message by depressing the button and/or knob. When selected, the computer 122 processes the selected discrete display message and generates an audio reproduction of the stored audio signals associated with the selected discrete display message for playback on an external audio device 150, such as a speaker or a headset including a speaker. In this way, the pilots can select a particular audio data transmission of interest for playback at the pilot's convenience. For instance, a pilot of the ownership aircraft 10 may playback an audio data transmission for confirmation or clarification of the radio communication content without transmitting a request to the source of the original communication for the content to be repeated. As a result, use of the bandwidth of a particular radio frequency is reduced, which results in more time for other communications.

The processor of computer 122 may determine additional information for each audio data transmission and store that information in memory 124. In embodiments, the processor of computer 122 may associate determined information with the audio data transmission as tag data. It is to be understood that any tag data described herein may be stored in memory 124 independently of the audio signals, the determined transmission frequency and the determined time of receiving each received audio data transmission in memory 124. The tag data may include a type of audio data transmission, a color code based on the type of audio data transmission, a tag lock to cause the display screen to pin the discrete display message, a station identifier, a communications radio type, and a leader to indicate whether the discrete audio data transmission originates from an ownship aircraft or from an external source.

In embodiments, the discrete audio data transmissions are stored in a remote communications log 134, which may be a storage device that is external to the computer 122. The remote communications log 134 may alternatively be a storage device that is integrated with the computer.

In embodiments, the system 100 may include a first audio communication data output configured to be communicatively coupled to the first communications radio and the processor of computer 122. The first audio communication data output is operable to output audio signals associated with audio data transmissions from an internal source. The processor of computer 122 receives audio signals and data associated with audio data transmissions transmitted by the first, second, and/or third communications radios 128, 132, 130, from the memory 124 and audio panel 126. The processor may receive transmitted audio data transmissions transmitted from the communications radios 128, 132, 130, categorize each of the transmitted audio data transmissions, and store the transmitted audio data transmissions in memory 124. The processor of computer 122 may determine the transmission frequency and the time of transmitting each audio data transmission was transmitted by first communications radio 128 and first audio communications data input/output 140. The transmission frequency and time of transmitting the audio data transmission may be determined by processing the audio data transmissions or using system information accessible to the processor. Similarly, the processor of computer 122 may determine the transmission frequency and the time of transmitting each audio data transmission was received by second communications radio 132 and second audio communications data input/output 142. As described above, the processor is may create a plurality of discrete display messages including text identifying the determined frequency and time of receiving each transmitted audio data transmission. It is to be understood that the processor may determine all of the information for transmitted audio data transmissions by applying processes applied to received audio data transmissions.

Figure 3:
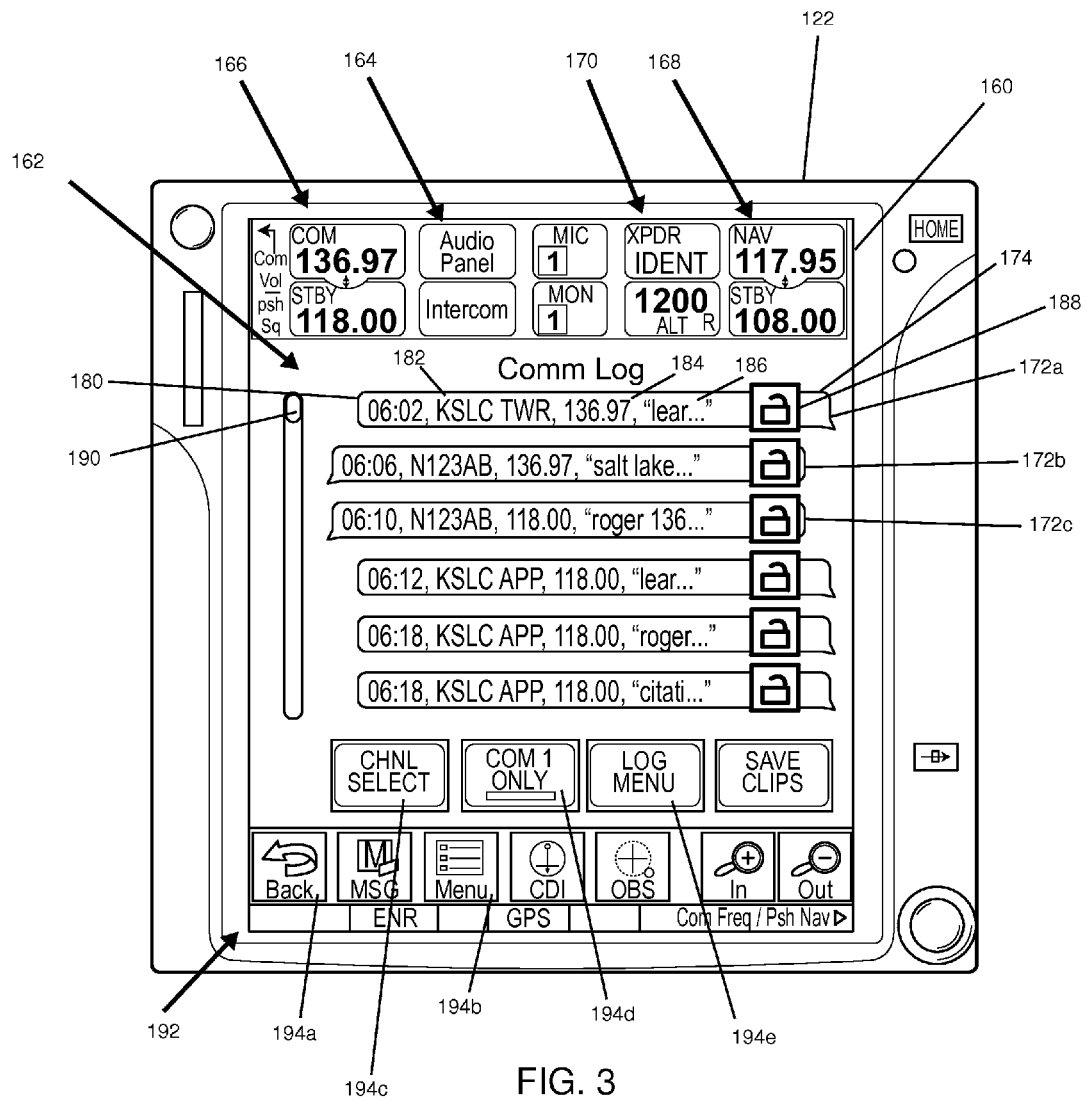
FIG. 3 is a front view of a display of the system of FIG. 2, illustrating an electronic representation of a communications log.

FIG. 3 illustrates a close up of the computer and display 122. The computer and display 122 includes a display screen 160 that displays the electronic communications log 162 of audio data transmissions. In one embodiment, the display screen 160 may be a touch screen type display that enables a user (e.g., the pilot) to select an area of the screen by touching the screen. In other embodiments, the display screen 160 may include activation buttons or knobs (not shown) located adjacent to selectable items on the display screen 160, or the display screen 160 may be responsive to voice commands through a microphone (not shown), to achieve the same result. The display screen 160 may also display other communications data with the electronic communications log 162. For example, the display screen 160 may present a COM summary area 164 that includes primary communications radio data 166 and primary navigation radio data 168. The COM summary area 164 may also include transponder data 170 or other information of use to the pilot(s) of the ownship aircraft 10.

The electronic communications log 162 may include a plurality of discrete display messages, such as discrete display messages 172a, 172b, 172c. Hereinafter, any discussion of a single discrete display message (e.g., 172a) will be equally applicable to any and all discrete display messages (e.g., 172b, 172c, etc.). Each discrete display message 172a is representative of a discrete audio data transmission either received from or transmitted by one of the first communications radio 128, the second communications radio 132, or the third communications radio 130. Each discrete display message 172a may be outlined or highlighted by a tag 174, for example with a "bubble" or other box, to set off or distinguish the discrete display message 172a from other discrete display messages (e.g., 172b, 172c, etc.). During processing of discrete audio data transmissions, the processor in the computer 122 associates the discrete display message 172a with the audio signals within the audio data transmission and data determined by processing the discrete audio data transmission. For example, the processor may associate data such as, for example, a determined time of receipt 180 (or time of transmission), a transmitting agency 182, a determined radio frequency 184, and message content text 186 of identified terms (or the full textual representation) of the audio data transmission, with the discrete display message 172a.

Each discrete display message 172a may also include a tag lock 188 graphic. In other embodiments, the discrete display message 172a may include a station identifier (not shown, which is typically a unique three or four letter code assigned to an individual station) or a radio type (e.g., COM1, COM2, NAV1, NAV2, INTERCOM, VHF1, VHF2, HF1, HF2, UHF 1, UHF 2, etc.). Additionally, each discrete display message 172a may be color coded to facilitate identification of the origination location of the transmission. For example, each discrete display message relating to communications (e.g., received by COM1) may be shaded in a first color, such as blue, while each discrete display message relating to navigation (e.g., receiving by NAV1) may be shaded in a second color, such as magenta. Other colors may be used for the shading and the recited colors are in no way limiting. However, the system could be configured to use color coding to identify certain features of the discrete display message, in addition to the origin location. In embodiments, discrete display messages associated with audio data transmissions received from external sources, such as other aircraft 12 or ground based air traffic control facility 14, are shaded in a first color and discrete display messages associated with audio data transmissions transmitted from the ownship aircraft 10 are shaded in second color.

In the embodiment of FIG. 3, the discrete display messages 172a are arranged in a list in chronological order, with the most recent discrete display message 172a being located at the top of the list. A slider 190 may be used to scroll through the list. The display screen 160 may also include a control area 192 that includes control buttons 194a, 194b, 194c, etc., which may be used to control the list and to select individual discrete display messages 172a for playback or for other operations.

Figure 4:
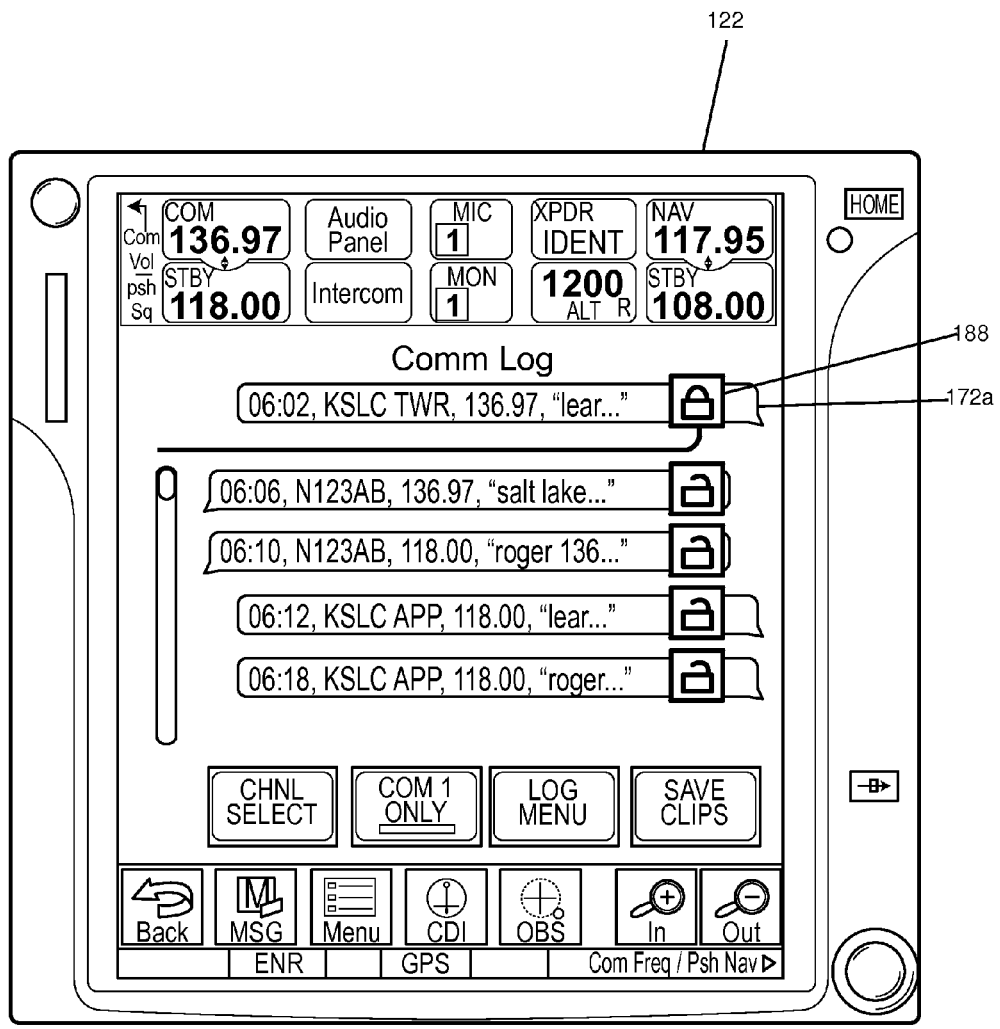
FIG. 4 is a front view of the display of FIG. 3, after user selection of a discrete display message associated with an audio data transmission.

In one embodiment, the tag lock 188 is selectable by the pilot. When selected, the selected discrete display message 172a is pinned to the top of the list presented by display device 160 and the tag lock 188 changes configuration to show a locked location, as illustrated in FIG. 4. This graphic, icon or other indication may vary in any manner to indicate the pinned or unpinned tag. In this way, the pilot(s) of ownship aircraft 10 can identify and keep a particularly important or useful radio communication in view for quick playback at a later time at his convenience. In some embodiments, selection of the tag lock 188 may also change a background color of the selected discrete display message 172a to further indicate that the tag lock 188 is active. If the tag lock 188 for more than one discrete display message 172a is selected, the locked discrete display messages 172a, 172b, may be displayed at the top of the list in the order in which they were selected. The tag lock 188 may be deselected, which moves the discrete display message 172a back to its chronological order in the list. In embodiments, multiple locked tags can be reordered, utilizing the controls described above, to obtain a customized order. The lock may be configured to automatically unlock tags based on elapsed time, unit power cycle, or "clear all" control. Tag locks may be configured to automatically lock if the pilot selects the tag 172a. In embodiments, processor of computer 122 may automatically change the scale of elements presented in the display device 160 based on user preference or the number of discrete display messages that have been tag locked (and thereby pinned) to the top of the electronic communications log 162.

Figure 5A:
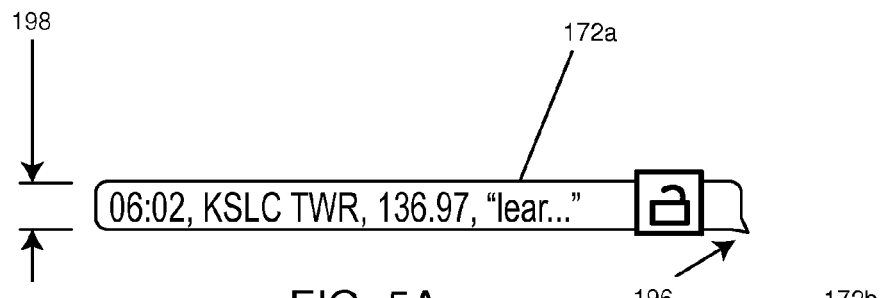
FIG. 5A is a close up view of a first selected discrete display message from the display of FIG. 3.
Figure 5B:
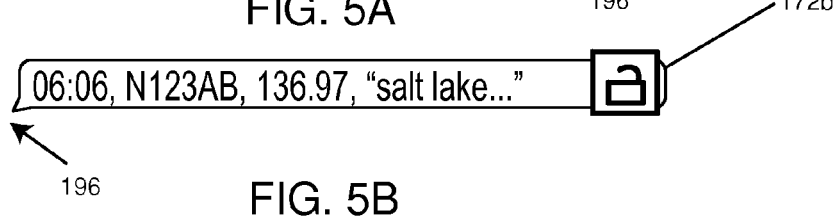
FIG. 5B is a close up view of a second selected display message from the display of FIG. 3.
Figure 5C:
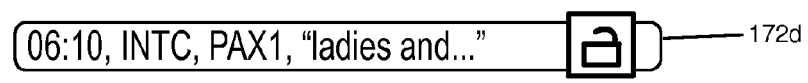
FIG. 5C is a close up view of a third selected discrete display message from the display of FIG. 3.

The processor may utilize a leader category to determine and indicate to the pilot(s) whether the discrete audio data transmission originates from an ownship aircraft 10 or from an external source, such as other aircraft 12 or ground based air traffic control facility 14. Each discrete display message 172a may also include a tag leader graphic element 196 (FIG. 5A) that may be attached to one side of the discrete display message 172a. The tag leader graphic element 196 may further indicate the origin of a transmission that generated the discrete display message 172. For example, the tag leader 196 may be attached to the right side of the discrete display message 172a to indicate that the origin of the transmission was received from an external source to the ownship aircraft 10, as illustrated in FIG. 5A. Similarly, the tag leader 196 may be attached to the left side of the discrete display message 172b (FIG. 5B) to indicate that the origin of the transmission was transmitted from the ownship aircraft 10 to an external recipient. Internal communications, or unrecognized communications, may be presented without a tag leader graphic element 196, as illustrated in FIG. 5C. In addition to the tag leader 196, all tags 174 may be shifted right or left for incoming or outgoing transmissions, respectively, as illustrated in FIGS. 5A and 5B. Alternatively, all tags 174 may be centered for internal (or unrecognized) communications, as illustrated in FIG. 5C.

Figure 6:
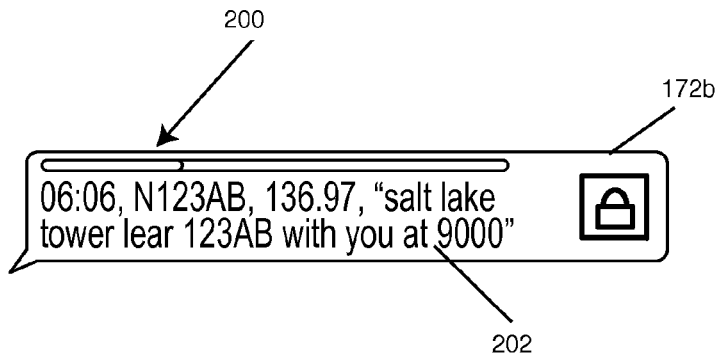
FIG. 6 is a close up view of an expanded discrete display message from the display of FIG. 3 that is selected for playback.

As illustrated in FIGS. 5A-5C, the unselected discrete display messages 172a may have a message height 198 appropriate for a single line of text to be presented. In embodiments, once the processor of computer 122 receives a user input (e.g., touch input, depression of a button or knob, etc.) selecting a discrete display message 172a, the processor of computer 122 may cause the discrete display message 172b to automatically expand to double the original message height 198 to display additional information associated with the discrete display message 172b, as illustrated in FIG. 6. For example, the expanded discrete display message 172b may include stored metadata, such as an indication of the current position 200 of the audio signals being played back to the pilot. Additionally, in embodiments, the processor of computer 122 may cause the display device 160 to display a fully expanded discrete display message 172b having sufficient area 202 to present the full textual representation of the stored audio signals and data associated with the audio data transmission. For instance, the processor of computer 122 may cause the fully expanded discrete display message 172b to be presented as a full-screen message or in separate pop-up message that can be edited, tag locked, organized or otherwise managed.

Returning now to FIG. 3, the control buttons 194a, 194b, 194c, etc. in the control area 192 will be discussed in more detail. The CHNL SELECT control button 194c enables the pilot to select a desired available audio channel and the tags 174 associated with that audio channel in the list of discrete display messages 172a. This functionality filters the display and control items available to the pilots in the display device 160. For example, only the air traffic control tower frequency is shown in the display device 160 of FIG. 3, but other audio data transmissions and related data that are not being displayed due to use of the CHNL SELECT control are being processed and stored for subsequent use. Consequently, the pilot(s) can focus on viewing and playing back important radio communications and return to view all audio data transmissions at their convenience at a later time. In embodiments, a quick select button 194d enables the pilot to filter the discrete display messages 172a based on one or more predetermined criteria. For instance, as shown in FIG. 3, the predetermined criteria may be a preset audio channel (or channels) "COM 1 ONLY." When the processor of computer 122 receives a user input selecting the quick select button 194d, the processor enables display device 160 to display only discrete display messages 172a associated with the preset audio channel COM1.

The function of the log menu button 194e allows the pilot to customize data displayed in the tag 174. For example, the log menu button 194e may allow the pilot to choose from available metadata fields to display in the tag 174. The log menu button 194e may also allow the pilot to select the type of audio playback desired. For example, the pilot may select either mono or stereo playback. In mono playback, the audio reproduction generated by the processor may be played back in both speakers of a headset 150. If a real-time radio communication is received, the audio reproduction may be interrupted until the real-time radio communication is completed. Alternatively, in stereo playback, the audio reproduction may be played back in one ear and any incoming real-time radio communications may be played back in the other ear. The log menu button 194e may also allow the discrete display messages 172a to be saved to an external source, such as a flash drive or memory card. The menu function (not pictured) may enable or disable a side-tone feature, available for stereo or mono playback modes. Enabling the side-tone adds a quiet tone to the communication data playback to help the pilots distinguish playback audio versus real-time audio. In an embodiment, the processor of computer 122 may add one or more short tone(s) to beginning and/or end of each audio data transmission playback to help pilot(s) distinguish playback audio signals from real-time audio signals received by a communications radio.

In some embodiments, the system 100 may interface with other systems via a wired or wireless connection. For example, the system 100 may interface via Bluetooth with a personal electronic device or smartphone, which may duplicate the communications log display and controls for ease of reference and use.

In other embodiments, the processor of computer 122 may utilize an emergency notification feature that causes the display device 160 to automatically display discrete display messages 172a received from emergency frequencies to the top of the communications log presented by display device 160.

Generally, the invention described above may be formed as a federated system comprising individual units, or the invention may be formed as an integrated single unit.

While the forgoing exemplary embodiment of the invention is described with respect to aircraft operations, other embodiments of the invention may be directed to virtually any type of communications environment, such as, for example, airport ground operations, shipping, trucking, rail roads, automobiles, spacecraft, military infantry, maritime operations, law enforcement, etc.

In one or more of the foregoing examples, the description uses terms such as upper, lower, front, back, top, bottom, inwardly and/or outwardly. These terms are relative only and are to be used in the context of describing the exemplary embodiments when positioned as shown in the Figures.

Those of skill in the art will readily understand that system components and displayed elements in the electronic communications log may be presented with difference elements and graphics than those shown in the Figures and those of skill in the art can readily understand how to adapt these elements to alternate presentations of the subject equipment and communications log features that are displayed.

Having thus described various embodiments of the invention, what is claimed as new and desired to be protected by Letters Patent includes the following:

1. A system for managing a communications log of audio data transmissions received by an ownship aircraft, the system comprising:
    a display screen;
    a memory configured to store audio signals and data associated with audio data transmissions;
    a first audio communications data input configured to be communicatively coupled to a first communications radio tuned to a first frequency and configured to receive audio signals associated with audio data transmissions from an external source; and
    a processor coupled to the display screen, to the memory, and to the first audio communications data input, the processor configured to:
        determine the first frequency and a time when the first communications radio received each audio data transmission,
        determine a full textual representation of audible content in the audio signals,
        identify one or more terms to be presented for each received audio data transmission from the full textual representation of the audible content,
        create a plurality of discrete display messages associated with each received audio data transmission, the discrete display messages including text identifying the determined first frequency, the determined time of receiving each received audio data transmission, and the one or more identified terms for each received audio data transmission,
        associate tag data with each audio data transmission and store the tag data in memory, and display the tag data including a tag leader graphic element attached to one side the discrete display message associated with the audio data transmission if the audio data transmission originates from the ownship aircraft, and the tag leader graphic element attached to other side of the discrete display message if the audio data transmission originates from the external source; and
        cause the display screen to display the discrete display messages each with the tag leader graphic element indicating the audio data transmission origin;
    wherein the discrete display messages displayed on the display screen are selectable by a user and the processor is further configured to generate an audio reproduction of the stored audio signals associated with the selected discrete display message for playback when the discrete display message is selected;
    wherein the one or more identified terms to be presented are less than the full textual representation; and
    wherein the selected discrete display message expands to display a full textual representation of the stored audio signal and an indication of the current playback position of the stored audio signal associated with the selected discrete display message being played back to a pilot.

2. The system of claim 1, further comprising a location determining component configured to determine a position of the ownship aircraft, wherein the processor is further configured to determine the source of each received audio data transmission based on the determined position and determined frequency.

3. The system of claim 1, further comprising a headset coupled with the processor, the headset including at least one speaker to align with a user's ear, wherein the generated audio reproduction of the stored audio signals is transmitted to the speaker for playback.

4. The system of claim 3, wherein the processor interrupts the audio reproduction playback if a real-time radio communications transmission is received from the audio communications data input.

5. The system of claim 3, wherein the generated audio reproduction is output to a first speaker of the headset and a real-time radio communication transmission received from the first audio communications data input is output to a second speaker of the headset.

6. The system of claim 1, further comprising a first audio communication data output configured to be communicatively coupled to the first communications radio and configured to output audio signals associated with audio data transmissions from an internal source, wherein the processor is further configured to determine the transmission frequency and time of transmitting each transmitted audio data transmission.

7. The system of claim 6, wherein the processor is further configured to create a plurality of discrete display messages including text identifying the determined frequency and time of receiving each transmitted audio data transmission.

8. The system of claim 1, further comprising a second communications data input that is configured to be communicatively coupled to a second communications radio tuned to a second frequency.

9. The system of claim 1, wherein the tag data further includes at least one of: a type of audio data transmission; a color code based on the type of audio data transmission; a tag lock to cause the display screen to pin the discrete display message; a station identifier; and a communications radio type.

10. The system of claim 1, wherein the first communications radio is a navigation radio and the first frequency is associated with a broadcast for weather information.

11. The system of claim 1, wherein the display screen includes a touch screen and the processor is configured to select a discrete display message displayed on the display screen based on a received touch input to the touch screen.

12. The system of claim 1, wherein the processor is further configured to determine a type of audio data transmission communication and associate a color code for the discrete display messages corresponding to the determined audio data transmission communication type.

13. A system for managing a communications log of audio data transmissions received by an ownship aircraft, the system comprising:
  a display screen including a plurality of discrete display messages;
  a memory configured to store audio signals and data associated with audio data transmissions;
  a first audio communications data input configured to be communicatively coupled to a first communications radio tuned to a first frequency and configured to receive audio signals associated with received audio data transmissions from an external source;
  a first audio communication data output configured to be communicatively coupled to the first communications radio and configured to output audio signals associated with transmitted audio data transmissions; and
  a processor coupled to the display screen, to the memory, to the first audio communications data input, and to the first audio communications data output, the processor configured to:
    determine a full textual representation of audible content in the audio signals associated with received and transmitted audio data transmissions,
    identify one or more terms to be presented for each received and transmitted audio data transmission from the full textual representation of audible content,
    create a plurality of discrete display messages associated with each audio data transmission, the discrete display messages for received audio data transmissions including text identifying the one or more identified terms for each received audio data transmission and the discrete display messages for transmitted audio data transmissions including text identifying the one or more identified terms for each transmitted audio data transmission,
    associate tag data with each audio data transmission and store the tag data in memory, and display the tag data including a tag leader graphic element attached to one side the discrete display message associated with the audio data transmission if the audio data transmission originates from the ownship aircraft and the tag leader graphic element attached to other side of the discrete display message if the audio data transmission originates from the external source; and
    cause the display screen to display the discrete display messages each with the tag leader graphic element indicating the audio data transmission origin;
  wherein the discrete display messages displayed on the display screen are selectable by a user and the processor is further configured to generate an audio reproduction of the stored audio signals associated with the selected discrete display messages for playback when the discrete display message is selected;
  wherein the one or more identified terms to be presented are less than the full textual representation; and
  wherein the selected discrete display message expands to display a full textual representation of the stored audio signal and an indication of the current playback position of the stored audio signal associated with the selected discrete display message being played back to a pilot.

14. The system of claim 13, further comprising a location determining component configured to determine a position of the ownship aircraft, wherein the processor is further configured to determine the source of each received audio data transmission based on the determined position.

15. The system of claim 14, wherein the tag data further includes at least one of: a type of audio data transmission; a color code based on the type of audio data transmission; a tag lock to cause the display screen to pin the discrete display message; a station identifier; and a communications radio type.

16. The system of claim 13, further comprising a second audio communications data input configured to be communicatively coupled to a second communications radio tuned to a second frequency and configured to receive audio signals associated with received audio data transmissions.

17. The system of claim 13, further comprising a headset coupled with the processor, the headset including at least one speaker to align with a user's ear, wherein the generated audio reproduction of the stored audio signals is transmitted to the speaker for playback.

18. A system for managing a communications log of audio data transmissions received by an ownship aircraft, the system comprising:
  a computer processor operatively coupled to a memory;
  a first routine stored in the memory and executable on the processor, the first routine instructing the processor to determine the transmission frequency and time of receiving each received audio data transmission, identify one or more terms from audible content in audio signals associated with the received audio data transmissions from a full textual representation of the audible content, and store the received audio signal and determined transmission frequency, time of receiving each received audio data transmission in memory, and the one or more identified terms;
  a second routine stored in the memory and executable on the processor, the second routine instructing the processor to create a discrete display message associated with each received audio data transmission, the received discrete display message including text identifying the determined transmission frequency, time of receiving each received audio data transmission, and the one of more identified terms;
  a third routine stored in the memory and executable on the processor, the third routine instructing the processor to send a signal to a display so that the discrete display message is displayed on the display each with a tag leader graphic element indicating the audio data transmission origin;
  a fourth routine stored in the memory and executable on the processor, the fourth routine processing a discrete display message selection input from a user and generating an audio reproduction signal that is sent to a speaker to playback the received audio signal stored in memory; and
  a fifth routine stored in the memory and executable on the processor the fifth routine instructing the processor to associate tag data with each audio data transmission and store the tag data in memory, and display the tag data including a tag leader graphic element attached to one side the discrete display message associated with the audio data transmission if the audio data transmission originates from the ownship aircraft, and the tag leader graphic element attached to other side of the discrete display message if the audio data transmission originates from the external source;
  wherein the one or more identified terms to be presented are less than the full textual representation; and
  wherein the selected discrete display message expands to display a full textual representation of the audio signal and an indication of the current playback position of the stored audio signal associated with the selected discrete display message being played back to a pilot.

19. The system of claim 18, further comprising a location determining component configured to determine a position of the ownship aircraft and a fifth routine stored in the memory and executable on the processor, the fifth routine instructing the processor to determine the source of each received audio data transmission based on the determined position and determined frequency.

20. The system of claim 18, wherein the fourth routine further includes displaying a full textual representation of the received audio signal in an expanded discrete display message.

21. The system of claim 13, wherein the processor is further configured to determine a type of audio data transmission communication and associate a color code for the discrete display messages corresponding to the determined audio data transmission communication type.

22. The system of claim 18, wherein the processor is further configured to determine a type of audio data transmission communication and associate a color code for the discrete display messages corresponding to the determined audio data transmission communication type.

* * * * *